E. PARKER.
SAFETY-GEARING.

No. 192,656.  Patented July 3, 1877.

WITNESSES.  INVENTOR.
Emery Parker.

ated in the same way, the plate and pulley being thus interlocked by the catch, will rotate together.

UNITED STATES PATENT OFFICE.

EMERY PARKER, OF NEW BRITAIN, CONNECTICUT.

IMPROVEMENT IN SAFETY-GEARING.

Specification forming part of Letters Patent No. 192,656, dated July 3, 1877; application filed March 28, 1877.

*To all whom it may concern:*

Be it known that I, EMERY PARKER, of New Britain, in the county of Hartford and State of Connecticut, have invented certain new and useful Improvements in Safety-Gearing; and I do hereby declare that the following specification, taken in connection with the drawings furnished and forming a part of the same, is a true, clear, and complete description thereof.

My improvements relate to what is termed "safety-"gearing, because, whether it be driven by belting or cogs, it is capable of such an adjustment with relation to its shaft that when strain or force greater than that which is requisite for driving its shaft, and the machinery connected therewith, is applied to the gear or pulley, it will rotate without revolving its shaft, and thereby prevent serious damage from occurring in case of breakage or other obstructive accident to the machinery.

Safety-gearing embodying my improvements differs in its operation from all other gearing of this class of which I am cognizant, in that when my gearing or pulley is rotatively released from its shaft, it is as free with relation thereto as any loose pulley, instead of requiring for its independent rotation a degree of power equal to or greater than that which is required for driving its shaft in its normal condition.

My invention consists in the combination, with a gear or pulley and a driving-plate, of a spring-catch, which, by the force of its spring, rotatively connects the pulley with the plate and its shaft, and which, when the pulley is disconnected, permits the pulley to rotate independently of its shaft, and as freely as a loose pulley or gear.

Figure 1:
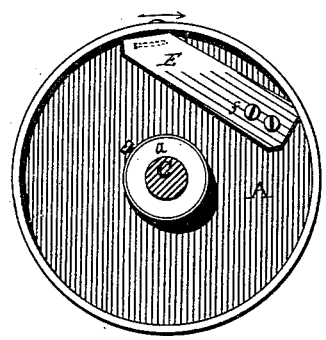
Figure 2:
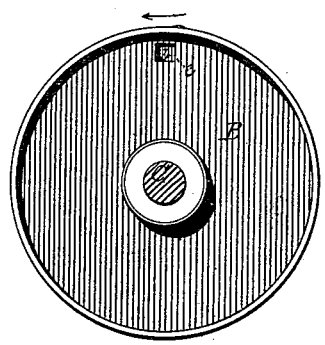
Figure 3:
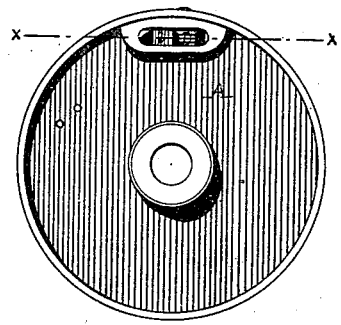
Figures 4, 5:
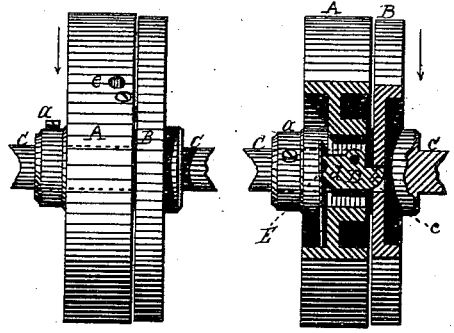

To more particularly describe my invention I will refer to the accompanying drawings, in which belt-gearing is illustrated as follows:

In Figures 1 and 3, side views of a pulley; Fig. 2, a similar view of a driving-plate; Fig. 4, a face view of the pulley and plate; and Fig. 5 a similar face view, partially in section, on line *x x*, Fig. 3.

The belt-pulley is shown at A, the driving-plate at B, and their shaft at C. It is, of course, immaterial, for the purposes of this specification, whether a belt-pulley or a cog-wheel be shown, or whether it is understood that the pulley is to drive the shaft or the shaft to drive the pulley. As shown in the drawings, the plate B is secured to the shaft, and the pulley is mounted alongside, after the manner of a loose pulley, and maintained in proper relation with the plate by a collar and set-screw, as at *a*. Instead of being thus separated, the plate and pulley may be connected by having a long hub on the plate turned off, so as to afford a loose seat for the pulley and a seat for the collar, on the outer end of the hub for retaining the pulley thereon.

The driving-plate is here shown in the form of a disk; but it will be seen that its form is immaterial, so long as it can be attached to a shaft, and has one or more radial arms for connection with the pulley. The device by which the pulley and plate are rotatively connected may be mounted upon and carried by either the pulley or the plate; but I have, in this instance, shown it to be mounted on the pulley.

D denotes the catch, which rotatively connects the plate and pulley. Its form may be largely varied; but if it be made in accordance with my invention, it must have the capacity not only to rotatively connect the plate and pulley, but also, when these are disconnected rotatively, it must leave the pulley as free to rotate independently of the plate or shaft as any loose pulley.

The most effective and simplest form of a catch of this character known to me is that of a lever located within a recess just inside the rim of the pulley, as shown, and mounted upon a fulcrum-pin, which permits the lever to swing across the plane of the web of the pulley.

At one end, as at *b*, the lever projects laterally beyond the rim of the pulley, and has a straight face for engaging with one side of the aperture *c* in the plate near its periphery, as shown in Fig. 5. The opposite end of the lever, as at *d*, is provided with two bearing-faces, one of which is concave, and the other straight.

E denotes a strong flat spring attached to the web of the pulley, which controls the catch. When the lever is set so as to engage with the driving plate, as shown in Fig. 5, the spring bears upon the concave bearing-face. If the lever be moved on its fulcrum, so that the plate and pulley are disconnected, then the spring, by bearing on the straight face of the lever, withdraws the opposite or projecting end into the recess, and maintains the lever in that position until special manipulation is applied for resetting it. In this instance, a hole is provided in the face of the pulley, as at *e*, through which a pin may be passed for engaging with the rear portion of the lever, and thereby resetting it. The lever, however, may be so arranged as to be accessible from the side of the pulley for resetting by having the spring slotted, as indicated in dotted lines in Fig. 1, and having a pin projecting from the rear end of the lever through the slot to serve as a handle. With such a construction the slot should be narrow and the pin small, and the lever should have sufficient thickness to afford good bearing-surface for the spring on each side of the slot.

In order to vary the capacity of the pulley to operate as a tight pulley, the spring E is provided with an adjusting-screw, as at *f*, whereby its force may be graduated.

It will be seen that my improvements may be applied to gears or pulleys on small shafts in machines, and also to line-shafting, and that by varying the form and proportions of the lever, and the capacity of the spring, they will be useful in any connection, and that in all cases, whenever the plate and pulley are disconnected, the latter will operate precisely as a loose pulley. The driving-plate may be provided with numerous apertures, *c*.

It is to be distinctly understood that I do not limit my invention to the precise construction herein shown and described, for I am well aware that the spring and catch may be constructed and applied in various ways without departing from the true spirit of my invention or attaining any different results.

I claim as new and desire to secure by Letters Patent—

The combination, with a gear or pulley and a driving-plate, of a spring-catch, which rotatively connects the pulley with the plate by the force of its spring, and which, when the pulley is disconnected, permits the pulley to rotate independently of its shaft and as freely as a loose pulley, substantially as described.

EMERY PARKER.

Witnesses:
HENRY E. RUSSELL,
THEO. E. SMITH.